United States Patent [19]

Yatomi et al.

[11] Patent Number: 5,081,333
[45] Date of Patent: Jan. 14, 1992

[54] ELECTRIC DISCHARGE MACHINING FLUID WITH A FATTY ACID AMIDE ADDITIVE FOR RUST INHIBITION

[75] Inventors: Takeshi Yatomi; Takeshi Iwasaki, both of Nagoya; Kenzo Yokoyama; Masahiro Noda, both of Kanagawa, all of Japan

[73] Assignee: Mitsubishi Denki Kabushiki Kabushiki Kaisha, Tokyo, Japan

[21] Appl. No.: 492,441

[22] Filed: Mar. 13, 1990

[30] Foreign Application Priority Data

| Mar. 17, 1989 | [JP] | Japan | 1-063497 |
| Mar. 17, 1989 | [JP] | Japan | 1-063498 |
| Apr. 18, 1989 | [JP] | Japan | 1-096431 |

[51] Int. Cl.⁵ ............................................ B23H 1/08
[52] U.S. Cl. ................................ 219/69.14; 252/576; 252/579
[58] Field of Search ............... 219/69.12, 69.14, 69.17; 252/570, 576, 579, 73, 77, 79, 392, 34.7, 308; 44/51

[56] References Cited

U.S. PATENT DOCUMENTS

| 3,671,427 | 6/1972 | Andrews, Jr. et al. | 252/308 |
| 3,892,670 | 7/1975 | White et al. | 252/34.7 |
| 4,013,863 | 3/1977 | van Osenbruggen et al. | 219/69.14 |
| 4,297,107 | 10/1981 | Boehmke | 44/51 |
| 4,388,199 | 6/1983 | Brandolese | 252/34.7 |
| 4,440,666 | 4/1984 | Miller et al. | 252/392 |
| 4,536,633 | 8/1985 | Onizuka | 219/69.14 |
| 4,623,773 | 11/1986 | Onizuka | 219/69.14 |
| 4,849,122 | 7/1989 | Imai et al. | 219/69.14 |
| 4,891,162 | 1/1990 | Schnellmann | 219/69.14 |

FOREIGN PATENT DOCUMENTS

| 41-16480 | 9/1966 | Japan. | |
| 51-147096 | 12/1976 | Japan. | |
| 52-56491 | 5/1977 | Japan | 219/69.14 |
| 53-2614 | 1/1978 | Japan. | |
| 53-12597 | 2/1978 | Japan. | |
| 104532 | 9/1978 | Japan | 219/69.14 |
| 56-107844 | 8/1981 | Japan. | |
| 56-108743 | 8/1981 | Japan. | |
| 57-132931 | 8/1982 | Japan. | |
| 59-4253 | 1/1984 | Japan. | |
| 60-23932 | 6/1985 | Japan. | |
| 61-4623 | 1/1986 | Japan. | |
| 61-188022 | 8/1986 | Japan. | |
| 62-94223 | 4/1987 | Japan. | |
| 62-181828 | 8/1987 | Japan. | |
| 62-236623 | 10/1987 | Japan. | |
| 62-236624 | 10/1987 | Japan. | |
| 62-241616 | 10/1987 | Japan. | |
| 62-251012 | 10/1987 | Japan. | |
| 63-2615 | 1/1988 | Japan. | |
| 63-2617 | 1/1988 | Japan. | |

*Primary Examiner*—Geoffrey S. Evans
*Attorney, Agent, or Firm*—Lowe, Price, LeBlanc & Becker

[57] ABSTRACT

Rust inhibitors for electrical discharge machining solutions. Each preventive is composed of a fatty acid amide which has been obtained by dehydrating and condensing at least one fatty acid and at least one alkanolamine.

10 Claims, No Drawings

ELECTRIC DISCHARGE MACHINING FLUID WITH A FATTY ACID AMIDE ADDITIVE FOR RUST INHIBITION

BACKGROUND OF THE INVENTION

1) Field of the Invention

The present invention relates to improvements in electrical discharge machining solutions of the aqueous solution type and also to improvements in electrical discharge machining processes which make use of an electrical discharge machining solution of the aqueous solution type. More specifically, the present invention provides rust inhibitors which have excellent rust preventive properties, are hardly adsorbed on ion-exchange resins and do not substantially lower the resistivities of electrical discharge machining solutions of the aqueous solution type. The present invention also provides aqueous-solution-type electrical discharge machining solutions which facilitate the control of high resistivity within a predetermined range and strongly inhibit the formation of rust on work pieces and machining equipment. The present invention further provides electrical discharge machining processes which can be stably practiced over a long time.

2) Description of the Related Art

Electrical discharge machining is a machining process for die-milling or die-sinking, boring or cutting an electrically conductive work piece by producing a spark discharge between a machining electrode and the work piece in an electrical discharge machining liquid or solution which is an insulating medium.

Conventionally, kerosene has been used primarily as such an electrical discharge machining liquid. Evaporation of kerosene is however unavoidable due to the generation of heat upon electrical discharge machining. Since kerosene is a highly flammable liquid, kerosene gas so evaporated and vaporized tends to catch a fire due to a spark or a pillar of arc produced upon electrical discharge. Kerosene therefore has the inherent drawback that it involves high fire hazards.

With a view toward avoiding the above-mentioned fire hazards, various techniques have been developed using the following non-flammable electrical discharge machining liquid or solutions.

(1) Pure water;
(2) Aqueous solutions of polyhydric alcohols such as glycols and saccharides (for example, Japanese Patent Publication No. 16480/1966, Japanese Patent Publication No. 4253/1984 and Japanese Patent Application Laid-Open No. 108743/1981.);
(3) Aqueous solutions of derivatives of polyhydric alcohols (for example, Japanese Patent Application Laid-Open No. 107844/1981, Japanese Patent Application Laid-Open No. 94223/1987, Japanese Patent Application Laid-Open No. 2614/1978 and Japanese Patent Application Laid-Open No. 2615/1988.);
(4) Aqueous solutions of polyethers (for example, Japanese Patent Laid-Open No. 4623/1986, Japanese Patent Laid-Open No. 181828/1987, Japanese Patent Laid-Open No. 236623/1987, Japanese Patent Laid-Open No. 236624/1987 and Japanese Patent Laid-Open No. 2617/1988.); and
(5) Mixtures of two or more of the above non-inflammable electrical discharge machining liquid and solutions (1)-(4).

Control of Resistivity

When electrical discharge machining is conducted using such an aqueous-solution-type non-flammable electrical discharge machining solution as described above, ionic impurities may accumulate in the electrical discharge machining solution so that the resistivity of the solution may drop. This resistivity reduction of the electrical discharge machining solution leads to the loss of the function of the solution as an insulating medium, thereby developing problems such as reduced efficiency of machining and increased electrode consumption. When these problems take place to substantial extents, the electrical discharge machining can no longer be continued. To machine work pieces by using such an aqueous-solution-type electrical discharge machining solution (hereinafter called "non-flammable electrical discharge machining solution"), it is generally necessary to control the resistivity of the non-flammable electrical discharge machining solution within a predetermined range (e.g., $10 \times 10^3 - 300 \times 10^3$ Ω.cm). As a method for controlling the resistivity of a non-flammable electrical discharge machining solution, it is the common practice that the solution is treated with ion-exchange resins.

Rust Preventive Technology

The above-described non-flammable electrical discharge machining solutions have a potential problem of producing rust on work pieces and machining equipment, as they contain water as a principal component.

Use of a rust inhibitor has therefore been proposed as a means for imparting rust preventive properties to non-flammable electrical discharge machining solutions, rust inhibitors for non-flammable electrical discharge machining solutions are required to be hardly adsorbed on ion-exchange resins and not to substantially reduce the resistivities of the non-flammable electrical discharge machining solutions, to say nothing of having excellent rust preventive properties.

From these standpoints, the rust inhibitors known to date were evaluated. The results are summarized as follows: (1) Rust inhibitors which are hardly adsorbed on ion-exchange resins have inferior rust preventive properties. Such rust inhibitors are disclosed in Japanese Patent Application Laid-Open No. 132931/1982, Japanese Patent Publication No. 23932/1985 Japanese Patent Application Laid-Open No.241616/1987, etc.

Japanese Patent Application Laid-Open No. 132931/1982

The invention disclosed in this patent publication is directed to rust-preventive non-flammable electrical discharge machining solutions each of which comprises an aqueous solution of at least one substance selected from polyhydric alcohols and hydroxyalkyl ethers having one or more hydroxyl groups and one or more ether bonds per molecule (for example, a 5 wt.% aqueous solution of propylene glycol, glycerin, D-sorbitol, ethylene glycol butyl ether or the like). The non-flammable electrical discharge machining solutions disclosed in this patent publication have no problem as long as their adsorption on ion-exchange resins and their resistivities are concerned, but they cannot exhibit satisfactory rust preventive properties.

Japanese Patent Application Laid-Open No. 241616/1987

The non-flammable electrical discharge machining solutions disclosed in this patent publication use, as rust inhibitors, 0.1 wt.% of D-sorbitol and 0.0005 wt.% of an addition product of stearyl alcohol and ethylene oxide. The non-flammable electrical discharge machining solutions do not have sufficient rust preventive effects.

Japanese Patent Application Laid-Open No. 188022/1986

1,1,1-Tris(hydroxymethyl)ethane (0.2 wt.%) is used as a rust inhibitor. However, no satisfactory rust preventive effects are exhibited.

Japanese Patent Application Laid-Open No. 251012/1987

This patent publication discloses electrical discharge machining solutions which contain D-sorbitol and triethanolamine as effective ingredients. No satisfactory rust preventive properties can however be obtained by the use of triethanolamine in such a small proportion as disclosed in this patent publication (triethanolamine concentration: 0.001–0.1 wt.%). However, the incorporation of triethanolamine in a large proportion results in a reduction to the resistivity of the aqueous solution. It is hence not preferred to use triethanolamine in such a large proportion. Further, it should be noted that triethanolamine can be easily adsorbed on an ion-exchange resin. Even if triethanolamine is incorporated in a large proportion, the rust preventive effects are reduced when the non-flammable electrical discharge machining solution is treated by the ion-exchange resin.

On the other hand, acid amides have been well-known as rust inhibitors. The present inventors are however not aware of any electrical discharge machining solution with such an acid amide added thereto. As one example of the incorporation of a polyacrylamide in an electrical discharge machining solution, there is the invention disclosed in Japanese Patent Publication No. 4253/1984.

(2) Substances excellent in rust preventive properties are liable to adsorption on ion-exchange resins and also reduce the resistivity. They are hence accompanied by the problem that their inclusion affects rust preventive properties and machining characteristics. Illustrative examples of these substances are as follows.

Japanese Patent Application Laid-Open No. 147096/1976

Proposed in this patent publication are non-flammable electron discharge machining solutions each of which comprises an aqueous solution of a water-soluble cellulose derivative and 0.2 wt.% of sodium nitrite or 0.2 wt.% of triethanolamine added thereto. Sodium nitrite and triethanolamine have good rust preventive properties. They however dissociate in water, so that they lower the resistivities of non-flammable electrical discharge machining solutions. It is therefore difficult to use them actually. In addition, sodium nitrite and triethanolamine are easily adsorbed on ion-exchange resins. The rust preventive effects of their solutions are hence reduced when the solutions are treated with an ion-exchange resin.

Japanese Patent Application Laid-Open No. 12597/1978

Monohydroxytricarboxylic acids are used as rust inhibitors. A carboxylic acid however dissociate in water so that the resistivity of a non-flammable electrical discharge machining solution is lowered. The monohydroxytricarboxylic acids are therefore not preferred. Further, a monohydroxytricarboxylic acid is easily adsorbed on an ion-exchange resin. When a non-flammable electrical discharge machining solution containing a monohydroxytricarboxylic acid is treated with an ion-exchange resin, the rust preventive properties of the non-flammable electrical discharge machining solution are reduced.

A rust inhibitor to be used in a non-flammable electrical discharge machining solution is required not only to have excellent rust preventive properties but also to satisfactorily have such characteristics that it is not easily adsorbed on an ion-exchange resin and it does not substantially lower the resistivity of a non-flammable electrical discharge machining solution. None of the conventional rust inhibitors can satisfy all the above requirements.

Furthermore, Japanese Patent Application Laid-Open No. 23932 discloses non-flammable electrical discharge machining solutions each of which is composed of an aqueous solution containing 0.5–5 wt.% of a polyethylene-glycol-modified product of lanolin—said product having been formed by adding 15–80 molecules, per each hydroxyl group of lanolin, of ethylene oxide to lanolin and/or reacting polyethylene glycol having a molecular weight of 300–1,000 with a fatty acid of lanolin - and 0.1–0.5 wt.% of a silicone-type defoaming agent. The non-flammable electrical discharge machining solutions disclosed in this patent publication contain a great deal of ethylene oxide or polyethylene glycol which has been incorporated in the molecules of lanolin to make lanolin soluble in water, whereby they cannot provide preferable rust preventive properties.

As has been described above, it is the presence situation that no satisfactory rust inhibitor is available because the conventional rust inhibitors are accompanied by such drawbacks that they have inferior rust preventive properties or deleteriously affect the machining characteristics of non-flammable electrical discharge machining solutions.

SUMMARY OF THE INVENTION

An object of the present invention is therefore to solve the above-described problems of the conventional art, namely, to find out a rust inhibitor which has excellent rust preventive properties, is hardly adsorbed on an ion-exchange resin and does not significantly lower the resistivity of a non-flammable electrical discharge machining solution.

Another object of the present invention is to provide a non-flammable electrical discharge machining solution having high resistivity, which can be easily controlled within a predetermined range, and having superb rust preventive properties.

A further object of the present invention is to provide an electrical discharge machining process which can inhibit the production of rust on work pieces and machining equipment and can be practiced stably over a long time.

The above objects can be achieved by using as a rust inhibitor a fatty acid amide obtained by subjecting a 1:1–1:3 molar ratio mixture of a fatty acid and an alkanolamine to dehydration and concentration. It is also embraced within the breadth of the present invention to add the fatty acid amide to aqueous-solution-type electrical discharge machining solutions which comprise aqueous solutions of polyhydric alcohols such as glycols or saccharides, aqueous solutions of derivatives of polyhydric alcohols, aqueous solutions of polyethers, or mixtures thereof.

In one aspect of the present invention, there are thus provided an aqueous-solution-type electrical discharge machining solution comprising (a) a fatty acid amide obtained by dehydrating and condensing at least one fatty acid and at least one alkanolamine, (b) at least one saccharide, and (c) water; and an electrical discharge machining process using the above machining solution. Preferably, the fatty acid amide (a) is obtained by dehydrating and condensing a 1:1–1:3 molar ratio mixture of the fatty acid and alkanolamine. The non-flammable electrical discharge machining solution has excellent rust preventive properties, is hardly adsorbed on ion-exchange resins and has a sufficiently high resistivity.

In another aspect of the present invention, there is also provided an electrical discharge machining solution comprising a fatty acid ester of a polyglycerin, said ester being composed principally of a monoester represented by the following formula (I):

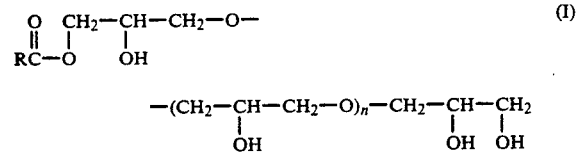

wherein n stands for an integer of from 0 to 8 and R means an unsubstituted or OH-substituted alkyl or alkenyl group having 5–21 carbon atoms.

In a further aspect of the present invention, there is also provided an electrical discharge machining process, which comprises conducting electrical discharge machining by a method known per se in the art while using the above non-flammable electrical discharge machining solution.

DETAILED DESCRIPTION OF THE INVENTION

A detailed description will hereinafter be made of the constituents of the rust inhibitors according to the present invention and aqueous-solution-type electrical discharge machining solutions using the rust inhibitors.

Fatty acid amides

The fatty acid amide which constitutes each rust inhibitor according to the present invention can be obtained by adding 1–3 moles of an alkanolamine to 1 mole of a fatty acid and then heating and dehydrating the resultant mixture at 130°–180° C.

If the molar ratio of the alkanolamine to the fatty acid exceeds 3, preferable rust preventive properties cannot be obtained and moreover, the resistivity of the resulting electrical discharge machining solution is excessively lowered. Such high molar ratios are hence not preferred.

Fatty acids

A fatty acid having 6–22 carbon atoms is used. When a fatty acid having 5 or less carbon atoms is used, satisfactory rust preventive properties cannot be obtained. On the other hand, the use of a fatty acid having 22 or more carbon atoms results in the formation of a fatty acid amide upon dehydration and condensation, which fatty acid amide has a lowered solubility in water and cannot be added to aqueous-solution-type electrical discharge machining solutions.

It is possible to provide a water-soluble fatty acid amide provided that the molar ratio of an alkanolamine to a fatty acid is increased beyond 3. However, such a fatty acid amide cannot be used as a rust inhibitor for the reasons mentioned above.

Exemplary fatty acids usable in the present invention include caproic acid, caprylic acid, capric acid, lauric acid, oleic acid, linoleic acid, linolenic acid, ricinoleic acid, erucic acid, coconut oil fatty acid or beef tallow fatty acid.

Alkanolamines

Illustrative alkanolamines usable in the present invention include monoethanolamine, diethanolamine, monoisopropanolamine and diisopropanolamine.

Ingredient (a)

The fatty acid amide employed as ingredient (a) in the present invention is the same substance as the fatty acid amide used as the rust inhibitor described above.

Ingredient (b)

Illustrative saccharides usable in the present invention include glucose, fructose, saccharose, maltose, mannitol, mannose, sorbitol and reducing sugars.

Ratio of fatty acid amide to saccharide

The preferred weight ratio of the fatty acid amide to the saccharide (fatty acid amide/saccharide) in the present invention ranges from 1/10 to 3/1.

Preferable rust preventive effects cannot be obtained when the ratio is smaller than 1/10 or greater than 3/1.

It is to be noted that the present invention embraces therein the addition of one or more of such fatty acid amides in non-flammable electrical discharge machining solutions which comprise aqueous solutions of polyhydric alcohols such as glycols or saccharides, aqueous solutions of derivatives of polyhydric alcohols, aqueous solutions of polyethers, or mixtures thereof, respectively.

Polyglycerin fatty acid esters

Polyglycerin fatty acid esters as rust inhibitors useful in the present invention are represented by the following formula (I):

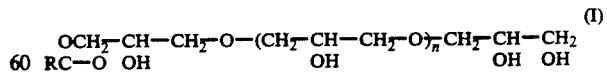

wherein n stands for an integer of from 0 to 8 and R means an unsubstituted or OH-substituted alkyl or alkenyl group having 5–21, preferably 5–17 carbon atoms.

No satisfactory rust preventive properties are available if the alkyl or alkenyl group contains only 4 or less carbon atoms. On the other hand, the water solubility is reduced when the carbon number of the alkyl or alkenyl group increases beyond 21. Such a large carbon number therefore cannot bring about the effects of the present invention. Accordingly, the preferred carbon number of the alkyl or alkenyl group is from 5 to 17.

In the present invention, the polymerization degree of the glycerin moieties in the formula (I) may practically be about 10 (namely, n=8).

Illustrative of the polyglycerin fatty acid ester usable in the present invention include those composed principally of monoesters between polyglycerins such as dodecaglycerin, decaglycerin, hexaglycerin, triglycerin and diglycerin and fatty acids such as caproic acid, caprylic acid, capric acid, lauric acid, oleic acid, coconut oil fatty acid and beef tallow fatty acid.

The above-described polyglycerins can be prepared by adding a small amount of a catalyst ($K_2CO_3$, KOH, NaOH, $H_2SO_4$ or the like) to glycerin and while blowing nitrogen gas into the resultant mixture, heating the mixture to a temperature of 200° C. or higher to induce dehydration and condensation.

A description will next be made of a process for the synthesis of the polyglycerin fatty acid esters. To synthesize the polyglycerin fatty acid esters, the following direct esterification technique or ester interchange technique can be used.

(1) Direct esterification technique:

A polyglycerin fatty acid ester can be prepared by charging a polyglycerin, an equimolar amount of a fatty acid and a catalyst in a reactor and dehydrating and condensing them at 160°-260° C. under a nitrogen gas stream until the free fatty acid is substantially used up.

The catalyst is usually an alkali catalyst such as sodium hydroxide. They can however be reacted without any catalyst.

There are other esterification processes in which a fatty acid anhydride or acid chloride is used instead of a free fatty acid.

(2) Ester interchange technique:

A polyglycerin fatty acid ester can also be obtained by charging a polyglycerin, an equimolar amount of a fatty acid methyl ester and an alkali catalyst (sodium hydroxide or the like) in a reactor and heating and reacting them at abut 150°-200° C. under reduced pressure while distilling off resulting methanol.

It is also possible to use a fatty acid ethyl ester or an oil or fat in place of the fatty acid methyl ester. In the case of a triglyceride, it is necessary to use it only at a molar ratio of 1:3 relative to the polyglycerin.

The non-flammable electrical discharge machining solution according to the present invention may preferably contain the above-described polyglycerin fatty acid ester in a proportion of 0.1-10 wt.%. If the content of the ester is smaller than 0.1 wt.%, satisfactory rust preventive effects cannot be brought about. On the other hand, the effects are not enhanced significantly even when the content of the ester exceeds 10 wt.%. It is thus uneconomical to use the ester in such a large proportion.

Application to non-flammable electrical discharge machining solution

The rust inhibitors according to the present invention can be added to non-flammable electrical discharge machining solutions which comprise aqueous solutions of polyhydric alcohols such as glycols or saccharides, aqueous solutions of derivatives of polyhydric alcohols, aqueous solutions of polyethers, or mixtures thereof, respectively.

The rust inhibitors of the present invention can be used by adding the same to such aqueous-solution-type electrical discharge machining solutions as needed upon use of the latter. It is also possible to have them contained in the aqueous-solution-type electrical discharge machining solutions in advance.

Concentration of fatty acid amide in non-flammable electrical discharge machining solution The concentration of the fatty acid amide in the non-flammable electrical discharge machining solution may preferably range from 0.1 wt.% to 5 wt.%. If the concentration of the fatty acid amide is smaller than 0.1 wt.%, preferable rust preventive effects cannot be brought about. On the other hand, the effects are not enhanced significantly even when the content of the fatty acid amide exceeds 5 wt.%. It is thus economically disadvantageous to use the fatty acid amide in such a large proportion.

Other Ingredients

The non-flammable electrical discharge machining solutions making us of the rust inhibitors of the present invention can also contain one or more of polyhydric alcohols such as glycols and saccharides, polyalkylene glycols, surfactants, defoaming agent and the like as needed.

Application Method

The non-flammable electrical discharge machining solutions are usually prepared in a form diluted with pure water, tap water or the like. The concentration of the fatty acid amide in the solution thus diluted preferably ranges from 0.05 wt.% to 5 wt.%. If the concentration of the fatty acid amide is lower than 0.05 wt.%, preferable rust preventive effects cannot be obtained. However, the effects are not enhanced significantly even when the concentration of the fatty acid amide exceeds 5 wt.%. It is thus uneconomical to use the fatty acid amide in such a large proportion.

The electrical discharge machining processes according to the present invention feature the practice of electron discharge machining in the non-flammable discharge machining solutions of the present invention by a method known per se in the art.

EMBODIMENTS OF THE INVENTION

The present invention will hereinafter be described more specifically by the following synthesis examples, examples and application examples. It should however be borne in mind that the present invention is by no means limited by them. The values pertaining to the ingredients of individual compositions will all be by wt.%.

Synthesis Example of Fatty Acid Amides

Fatty acid amide A:

A reaction flask was charged with isononanoic acid and diethanolamine at a molar ratio of 1:2. The air in the flask was purge with nitrogen. A condensation reaction was conducted with stirring under nitrogen gas, whereby fatty acid amide A was obtained. The reaction temperature and time were 140° C. and 5 hours, respectively.

Fatty acid amide B:

Fatty acid amide B was obtained in a similar manner to fatty acid amide A except that caprylic acid and mono-isopropanolamine were used at a molar ratio of 1:1.3. The reaction temperature and time were 140° C. and 5 hours, respectively.

Fatty acid amide C:

Fatty acid amide C was obtained in a similar manner to fatty acid amide A except that caproic acid and diisopropanolamine were used at a molar ratio of 1:1. The reaction temperature and time were 140° C. and 5 hours, respectively.

Fatty acid amide D:

Fatty acid amide D was obtained in a similar manner to fatty acid amide A except that oleic acid and diethanolamine were used at a molar ratio of 1:2. The reaction temperature and time were 160° C. and 5 hours, respectively.

Fatty acid amide E:

Fatty acid amide E was obtained in a similar manner to fatty acid amide A except that coconut oil fatty acid and monoethanolamine were used at a molar ratio of 1:1.7. The reaction temperature and time were 150° C. and 5 hours, respectively.

EXAMPLES 1–10 & COMPARATIVE EXAMPLES 1–2

Based on the compositions shown in Table 1, stocks of non-flammable electrical discharge machining solutions according to the present invention (Examples 1–10) and those of comparative electrical discharge machining solutions (Comparative Examples 1–2) were prepared. Prior to testing, each stock was diluted with water to have a resistivity of 5,000 Ω·cm and a stock concentration of 1 wt.%.

TABLE 1

| | Sample No. | | | | | | | | | | | |
|---|---|---|---|---|---|---|---|---|---|---|---|---|
| | Example | | | | | | | | | | Comp. Ex. | |
| Ingredient | 1 | 2 | 3 | 4 | 5 | 6 | 7 | 8 | 9 | 10 | 1 | 2 (1) |
| Fatty acid amide | | | | | | | | | | | | |
| A | 5 | 5 | 30 | 30 | 10 | 10 | — | — | — | — | 30 | — |
| B | | | | | | | 10 | — | — | — | | |
| C | | | | | | | — | 10 | — | — | | |
| D | | | | | | | — | — | 10 | — | | |
| E | | | | | | | — | — | — | 10 | — | — |
| Saccharide | | | | | | | | | | | | |
| Reducing maltose | 10 | 50 | — | — | 30 | — | 30 | 30 | 30 | 30 | — | 50 |
| Sorbitol | — | — | 10 | 30 | — | 30 | | | | | | |
| Pure water | 85 | 40 | 60 | 40 | 60 | 60 | 60 | 60 | 60 | 60 | 70 | 50 |

Note (1)
Comparative Example 2 is the electrical discharge machining solution disclosed in Japanese Patent Application Laid-Open No. 132931/1982.

Rust Preventive Property Test

The rust preventive properties of each of the electrical discharge machining solutions prepared as described above were tested in the following manner.

Testing method

Only 400 ml of the test solution prepared as described above were poured into a 500-ml beaker. A cold-rolled steel plate, which satisfied the standards G3141 of the Japan Industrial Standards (hereinafter abbreviated as "JIS") and had dimensions of 1.2×60×80 mm, was immersed in the test solution. The degree of rusting was observed 48 hours later and 96 hours later.

The observation results were ranked in accordance with the rusting degree measuring method prescribed in JIS K2246. The results are summarized in Table 2 and Table 3.

TABLE 2

| | Resistivity | Rusting degree (1) | | |
|---|---|---|---|---|
| Sample | (Ω·cm) | 48 hours | 96 hours | pH |
| 1 wt.% dilute (2) solution | | | | |
| Ex. 1 | $5 \times 10^3$ | Class A | Class A | 10.2 |
| Ex. 2 | $5 \times 10^3$ | Class A | Class A | 10.2 |
| Ex. 3 | $5 \times 10^3$ | Class A | Class A | 10.5 |
| Ex. 4 | $5 \times 10^3$ | Class A | Class A | 10.5 |
| Ex. 5 | $5 \times 10^3$ | Class A | Class A | 10.4 |
| Ex. 6 | $5 \times 10^3$ | Class A | Class A | 10.4 |
| Ex. 7 | $5 \times 10^3$ | Class A | Class A | 10.7 |
| Ex. 8 | $5 \times 10^3$ | Class A | Class A | 10.1 |
| Ex. 9 | $5 \times 10^3$ | Class A | Class A | 10.6 |
| Ex. 10 | $5 \times 10^3$ | Class A | Class A | 10.9 |
| Comp. Ex. 1 | $5 \times 10^3$ | Class B | Class C | 10.5 |
| Comp. Ex. 2 | $5 \times 10^3$ | Class D | Class E | 6.7 |
| Known Example 1 (3) | $1 \times 10^3$ | Class A | Class A | 10.2 |
| Known Example 2 (3) | $5 \times 10^3$ | Class D | Class E | 6.5 |
| Known Example 3 (3) | $5 \times 10^3$ | Class E | Class E | 6.4 |
| Known Example 4 (3) | $5 \times 10^3$ | Class E | Class E | 6.9 |
| Known Example 5 (3) | $5 \times 10^3$ | Class E | Class E | 6.4 |
| Pure water | $1 \times 10^6$ | Class E | Class E | 6.3 |

TABLE 3

| (After treatment with ion-exchange resins) | | | | |
|---|---|---|---|---|
| | Resistivity | Rusting degree (1) | | |
| Sample | (Ω·cm) | 48 hours | 96 hours | pH |
| 1 wt.% dilute (2) solution | | | | |
| Ex. 1 | $100 \times 10^3$ | Class A | Class A | 8.4 |
| Ex. 2 | $100 \times 10^3$ | Class A | Class A | 8.4 |
| Ex. 3 | $60 \times 10^3$ | Class A | Class A | 8.8 |
| Ex. 4 | $60 \times 10^3$ | Class A | Class A | 8.9 |
| Ex. 5 | $80 \times 10^3$ | Class A | Class A | 8.6 |
| Ex. 6 | $80 \times 10^3$ | Class A | Class A | 8.6 |
| Ex. 7 | $80 \times 10^3$ | Class A | Class A | 8.7 |
| Ex. 8 | $80 \times 10^3$ | Class A | Class A | 8.4 |
| Ex. 9 | $70 \times 10^3$ | Class A | Class A | 8.7 |
| Ex. 10 | $70 \times 10^3$ | Class A | Class A | 9.0 |
| Comp. Ex. 1 | $70 \times 10^3$ | Class D | Class D | 8.7 |
| Comp. Ex. 2 | $250 \times 10^3$ | Class D | Class E | 6.7 |
| Known Example 1 (3) | $100 \times 10^3$ | Class E | Class E | 7.5 |
| Known Example 2 (3) | $150 \times 10^3$ | Class E | Class E | 6.6 |
| Known Example 3 (3) | $250 \times 10^3$ | Class E | Class E | 6.3 |
| Known Example 4 (3) | $300 \times 10^3$ | Class E | Class E | 6.7 |
| Known Example 5 (3) | $300 \times 10^3$ | Class E | Class E | 6.4 |
| Pure water | | | | 6.3 |

Note (1)
Class A - Rusting degree ... 0%
Class B - Rusting degree ... 1–10%
Class C - Rusting degree ... 11–25%
Class D - Rusting degree ... 26–50%
Class E - Rusting degree ... 51–100%

Note (2)
Diluted with tap water (resistivity: 5,000 Ω·cm).

Note (3)
Known Example 1 is sodium nitrite (0.2 wt.%) plus ethanolamine (0.2 wt.%), which is a rust inhibitor disclosed in Japanese Patent Application Laid-Open No. 147096/1976.
Known Example 2 is 1,1,1-tris(hydroxymethyl)ethane (0.2 wt.%), which is a rust inhibitor disclosed in Japanese Patent Application Laid-Open No. 188022/1986.
Known Example 3 is glycerin (1 wt.%), which is a rust inhibitor disclosed in Japanese Patent Application Laid-Open No. 132931/1982.
Known Example 4 is D-sorbitol (0.1 wt.%) plus stearyl alcohol-8 moles ethylene oxide addition product (0.0005 wt.%), which is a rust inhibitor disclosed in Japanese Patent Application Laid-Open No. 241616/1987.
Known Example 5 is D-sorbitol (0.1 wt.%) plus triethanolamine (0.05 wt.%), which is a rust inhibitor disclosed in Japanese Patent Application Laid-Open No. 251012/1987.

Application Example 1

Electrical discharge machining

Tap water was added with 1 wt.% of the electrical discharge machining solution of Example 1. The resistivity of a wire-cutting electrical discharge machine was set at 100,000 Ω.cm. Machining was then conducted under the following conditions:

| Machine: | Wire-cutting electrical discharge machine |
|---|---|
| Wire: | Brass; diameter: 0.2 mm |
| Work piece: | SKD11 |
| Speed: | 120 mm²/min |

Even after the machining was conducted for 10 hours, absolutely no rust was produced on the surface of the work piece. Further, the machining was smooth and stable. When the wire was subjected to second cutting work, the wire was resistant to breaking owing to the absence of rust so that the working efficiency was improved and no streaks were formed on the finished surfaces.

Application Example 2

Electrical discharge machining

Tap water was added with 1 wt.% of the electrical discharge machining solution of Example 8 and 20 wt.% of polyethylene glycol (molecular weight: 1,000). The resistivity of a diesinking electrical discharge machine was set at 300,000 Ω.cm. Machining was then conducted under the following conditions:

| Machine: | Diesinking electrical discharge machine |
|---|---|
| Work piece: | SK3 |
| Electrode: | Graphite |

Even after the machining was conducted for 10 hours, absolutely no rust was produced on the surface of the work piece.

Non-flammable electrical discharge machining solutions according to the present invention were prepared using the polyglycerin fatty acid monoesters shown below in Table 4. Comparative non-flammable electrical discharge machining solutions were also prepared using the known rust inhibitors (Comparative Examples 1, 2, 3, 6 and 7).

prepared as described above, rust preventive property tests were conducted in accordance with the testing method set forth next to Table 1.

The test results were ranked in accordance with the rusting degree measuring method prescribed in JIS K2246.

The results are also shown in Table 4. Table 4 also contains the rust preventive properties of those non-flammable electron discharge machining solutions after treated with the ion-exchange resins subsequent to their preparation.

Application Example

Electron discharge machining

Tap water was added with 0.5 wt.% of decaglycerin monocaprylate. The resistivity of a wire-cutting electrical discharge machine was set at 100,000 Ω.cm. Machining was then conducted under the following conditions:

| Machine: | Wire-cutting electrical discharge machine |
|---|---|
| Wire: | Brass; diameter: 0.2 mm |
| Work piece: | SKD11 |
| Speed: | 120 mm²/min |

Even after the machining was conducted for 10 hours, absolutely no rust was produced on the surface of the work piece. Further, the machining was smooth and stable. When the wire was subjected to second cutting work, the wire was resistant to breaking owing to the absence of rust so that the working efficiency was improved and no streaks were formed on the finished surfaces.

Application Example 4

Electrical discharge machining

Tap water was added with 0.2 wt.% of hexaglycerin monocaprylate and 20 wt.% of polyethylene glycol (molecular weight: 1,000). The resistivity of a diesinking electron discharge machine was set at 300,000 Ω.cm.

TABLE 4

| | | Property | | | | | |
|---|---|---|---|---|---|---|---|
| | Amount | Before treatment with ion-exchange resins | | | After treatment with ion-exchange resins | | |
| | added | Resistivity | Rust preventive properties | | Resistivity | Rust preventive properties | |
| Sample solution | (wt. %) | (×10³ Ω · cm) | 48 hours | 96 hours | (×10³ Ω · cm) | 48 hours | 96 hours |
| Decaglycerin | 0.2 | 120 | Class A | Class A | 150 | Class A | Class A |
| monooleate | 0.5 | 110 | Class A | Class A | 125 | Class A | Class A |
| Decaglycerin | 0.2 | 115 | Class A | Class A | 140 | Class A | Class A |
| monocaproate | 0.5 | 100 | Class A | Class A | 120 | Class A | Class A |
| Decaglycerin | 0.2 | 110 | Class A | Class A | 140 | Class A | Class A |
| monocaprylate | 0.5 | 105 | Class A | Class A | 120 | Class A | Class A |
| Hexaglycerin | 0.2 | 110 | Class A | Class A | 150 | Class A | Class A |
| monocaprylate | 0.5 | 105 | Class A | Class A | 125 | Class A | Class A |
| Known Example 1 | | 2 | Class A | Class A | 100 | Class E | Class E |
| Known Example 2 | | 150 | Class D | Class E | 170 | Class E | Class E |
| Known Example 6 (4) | | 250 | Class E | Class E | 260 | Class E | Class E |
| Known Example 3 (4) | | 300 | Class E | Class E | 300 | Class E | Class E |
| Known Example 7 (4) | | 300 | Class E | Class E | 300 | Class E | Class E |
| Pure water | | 1,000 | Class E | Class E | 1,000 | Class E | Class E |

(Legend)
Class A to Class E have the same meanings as set forth in Note (1) below Table 3.
Note (4)
Known Example No. 6 is propylene glycol (5 wt. %), which is a rust inhibitor disclosed in Japanese Patent Application Laid-Open No. 132931/1982.
Known Example No. 3 is glycerin (1 wt. %), which is a rust inhibitor disclosed in Japanese Patent Application Laid-Open No. 132931/1982.
Known Example No. 7 is D-sorbitol (0.1 wt. %) plus stearyl alcohol/8 moles ethylene oxide addition product (0.0005 wt. %), which is a rust inhibitor disclosed in Japanese Patent Application Laid-Open No. 241616/1987.

Rust preventive Property Test

With respect to the rust preventive properties of the non-flammable electrical discharge machining solutions Machining was then conducted under the following conditions:

| Machine: | Diesinking electrical discharge machine |
|---|---|
| Work piece: | SK3 |
| Electrode: | Graphite |

Even after the machining was conducted for 10 hours, absolutely no rust was produced on the surface of the work piece.

Rust Preventive Property Test

The below-described test solutions were prepared using tap water (resistivity: 5,000 Ω.cm). Their rust preventive properties were tested both before and after their treatment with ion-exchange resins, whereby the rust preventive properties of the rust inhibitors of the invention examples were compared with those of the rust inhibitors of the comparative examples.

Sample solutions

Example 11:1 wt.% aqueous solution of fatty acid amide A.

Example 12: 1 wt.% aqueous solution of fatty acid amide B.

Example 13: 1 Wt.% aqueous solution of fatty acid amide C.

Example 14:1 wt.% aqueous solution of fatty acid amide D

Example 15: 1 wt.% aqueous solution of fatty acid amide E.

Example 16: Aqueous solution of fatty acid amide A (1 wt.%) and glycerin (1 wt.%).

Example 17: Aqueous solution of fatty acid amide B (1 wt.%) and glycerin (1 wt.%).

Example 18: Aqueous solution of fatty acid amide C (0.5 wt.%) and polyethylene glycol (average molecular weight: 600; 20 wt.%).

Example 19: Aqueous solution of fatty acid amide D (0.5 wt.%) and diethylene glycol monobutyl ether (30 wt.%).

Example 20: Aqueous solution of fatty acid amide E (0.5 wt.%) and sucrose (10 wt.%).

Testing method

Rust preventive property tests were conducted in accordance with the method set forth next to Table 1. The test results were ranked in accordance with the rusting degree measuring method prescribed in JIS K2246.

Results of rust preventive property tests

With respect to each sample solution, the rust preventive properties were tested both before and after its treatment with ion-exchange resins. The results before the treatment and those after the test are shown in Table 5 and Table 6, respectively.

TABLE 5

| Sample | Resistivity (Ω · cm) | Rusting degree (1) 48 hours | 96 hours | pH |
|---|---|---|---|---|
| Example 11 | 5,000 | Class A | Class A | 10.7 |
| Example 12 | 5,000 | Class A | Class A | 10.8 |
| Example 13 | 5,000 | Class A | Class A | 10.5 |
| Example 14 | 5,000 | Class A | Class A | 10.8 |
| Example 15 | 5,000 | Class A | Class A | 10.9 |
| Example 16 | 5,000 | Class A | Class A | 10.7 |
| Example 17 | 5,000 | Class A | Class A | 10.8 |
| Example 18 | 5,000 | Class A | Class A | 10.5 |
| Example 19 | 5,000 | Class A | Class A | 10.7 |
| Example 20 | 5,000 | Class A | Class A | 10.9 |

TABLE 5-continued

| Sample | Resistivity (Ω · cm) | Rusting degree (1) 48 hours | 96 hours | pH |
|---|---|---|---|---|
| Known Example 1 | 1,000 | Class A | Class A | 10.2 |
| Known Example 2 | 5,000 | Class D | Class E | 6.5 |
| Known Example 3 | 5,000 | Class E | Class E | 6.4 |
| Known Example 4 | 5,000 | Class E | Class E | 6.9 |
| Known Example 5 | 5,000 | Class E | Class E | 6.4 |
| Pure water | 1,000,000 | Class E | Class E | 6.3 |

TABLE 6

| Sample | Resistivity (Ω · cm) | Rusting degree (1) 48 hours | 96 hours | pH |
|---|---|---|---|---|
| Example 11 | 80,000 | Class A | Class A | 9.0 |
| Example 12 | 80,000 | Class A | Class A | 9.0 |
| Example 13 | 55,000 | Class A | Class A | 8.7 |
| Example 14 | 55,000 | Class A | Class A | 8.9 |
| Example 15 | 70,000 | Class A | Class A | 9.1 |
| Example 16 | 70,000 | Class A | Class A | 9.0 |
| Example 17 | 70,000 | Class A | Class A | 9.1 |
| Example 18 | 70,000 | Class A | Class A | 8.8 |
| Example 19 | 70,000 | Class A | Class A | 8.6 |
| Example 20 | 70,000 | Class A | Class A | 9.0 |
| Known Example 1 | 100,000 | Class A | Class E | 10.2 |
| Known Example 2 | 150,000 | Class E | Class E | 6.5 |
| Known Example 3 | 250,000 | Class E | Class E | 6.4 |
| Known Example 4 | 300,000 | Class E | Class E | 6.9 |
| Known Example 5 | 300,000 | Class E | Class E | 6.4 |

(Legend)
Class A to Class E have the same meanings as set forth in Note (1) below Table 3.

As is understood from Table 5 and Table 6, the sample solutions of Examples 11-20 were not changed in rust preventive properties between before and after their treatment with the ion-exchange resins, whereby they demonstrated excellent rust preventive properties. These results indicate that the rust inhibitors of Examples 11-20 are hardly adsorbed on the ion-exchange resins.

In contrast, the sample solutions of Known Examples 1-5 included those having insufficient rust preventive properties even before they were treated with the ion-exchange resins. After the treatment with the ion-exchange resins, the rusting degrees of the sample solutions of the known examples all became Class E. It is hence clear that their rust preventive properties were extremely impaired. These results indicate that the rust inhibitors of the known examples were adsorbed on the ion-exchange resins.

As has been demonstrated above, the rust inhibitors of Examples 11-20 exhibit sufficient rust preventive performance and are hardly adsorbed on ion-exchange resins. Therefore, the rust preventive properties of the non-flammable electrical discharge machining solutions are not reduced even after treated with ion-exchange resins.

Further, the resistivities of the sample solutions of Examples 11-20 after treated with the ion-exchange resins ranges from $55 \times 10^3$ Ω.cm to $80 \times 10^3$ Ω.cm, which were all within a predetermined range ($10 \times 10^3 - 300 \times 10^3$ Ω.cm). The rust inhibitors of Examples 11-20 have therefore been confirmed not to reduce the resistivity of a non-flammable electrical discharge machining solution to a significant extent.

Application Example 5

Electrical discharge machining

Using the sample solution of Example 11 as a non-flammable electrical discharge machining solution and setting the resistivity of a wire-cutting electrical discharge machine at 100,000 Ω.cm, machining was conducted under the following conditions:

| Machine: | Wire-cutting electrical discharge machine |
|---|---|
| Wire: | Brass; diameter: 0.2 mm |
| Work piece: | SKD11 |
| Speed: | 120 mm²/min |

Even after the machining was conducted for 10 hours, absolutely no rust was produced on the surface of the work piece. Further, the machining was smooth and stable. When the wire was subjected to second cutting work, the wire was resistant to breaking owing to the absence of rust so that the working efficiency was improved and no streaks were formed on the finished surfaces.

Application Example 6

Electrical discharge machining

Tap water was added with 1 wt.% of fatty acid amide C and 20 wt.% of polyethylene glycol (molecular weight: 1,000). Using the thus-prepared solution as a non-flammable electrical discharge machining solution and setting the resistivity of a diesinking electrical discharge machine at 300,000 Ω.cm, machining was conducted under the following conditions:

| Machine: | Diesinking electrical discharge machine |
|---|---|
| Work piece: | SK3 |
| Electrode: | Graphite |

Even after the machining was conducted for 10 hours, absolutely no rust was produced on the surface of the work piece.

ADVANTAGEOUS EFFECTS OF THE INVENTION

The rust inhibitors of the present invention have sufficient rust preventive properties and are hardly adsorbed on ion-exchange resins. They have low reactivity with ion-exchange resins. When they are added to non-flammable electrical discharge machining solutions, they exhibit the advantage that the resistivities of the non-flammable electrical discharge machining solutions are not lowered significantly.

Use of the non flammable electrical discharge machining solutions of the present invention, said solutions having been added with the above rust inhibitors, makes it possible to improve both the rust preventive properties and the working efficiency although the conventional non-flammable electron discharge machining solutions cannot achieve it.

The polyglycerin fatty acid esters employed in the non-flammable electrical discharge machining solutions of the present invention have strong rust preventive properties. Moreover, the polyglycerin fatty acid esters of the present invention do not have the problem of significantly reducing the resistivities of non-flammable electrical discharge machining solutions. They are adsorbed onto to a slight extent on ion-exchange resins. In addition, they have low reactivity with ion-exchange resins.

Accordingly, the present invention has made it possible to achieve improvements in both the rust preventive properties and the working efficiency, which improvements have not been achieved by any conventional non-flammable electron discharge machining solutions.

We claim:

1. An electrical discharge machining solution comprising a fatty acid ester of a polyglycerin, said ester being composed principally of a monoester represented by the following formula (I):

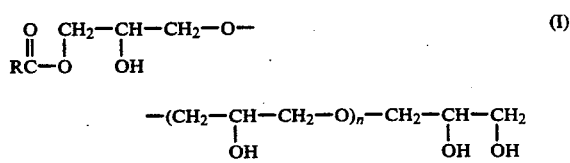

wherein n stands for an integer of from 0 to 8 and R means an unsubstituted or OH-substituted alkyl or alkenyl group having 5-21 carbon atoms.

2. The solution of claim 1, wherein the group R has 5-17 carbon atoms.

3. The solution of claim 1, wherein the polyglycerin is selected from dodecaglycerin, decaglycerin, hexaglycerin, triglycerin or diglycerin.

4. The solution of claim 1, wherein the fatty acid ester is selected from the caproic acid ester, caprylic acid ester, capric acid ester, lauric acid ester, oleic acid ester, linoleic acid ester, linolenic acid ester, ricinoleic acid ester, erucic acid ester, isononanoic acid ester, coconut oil fatty acid ester or beef tallow fatty acid ester.

5. The solution of claim 1, wherein the fatty acid ester of the polyglycerin is contained at a concentration of 0.1-10 wt.%.

6. An electrical discharge machining process for machining a work piece by producing an electrical discharge between an electrode and the work piece, wherein the electrical discharge is produced between the electrode and the work piece in an electrical discharge machining solution which comprises a fatty acid ester of a polyglycerin, said ester being composed principally of a monoester represented by the following formula (I):

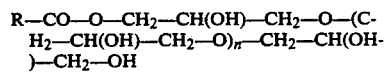

wherein n stands for an integer of from 0 to 8 and R means an unsubstituted of OH-substituted alkyl or alkenyl group having 5-21 carbon atoms.

7. The process of claim 6, wherein the group R has 5-17 carbon atoms.

8. The solution of claims 6, wherein the fatty acid ester of the polyglycerin is contained at a concentration of 0.1-10 wt.%.

9. The solution of claim 6, wherein the polyglycerin is selected from dodecaglycerin, decaglycerin, hexaglycerin, triglycerin or diglycerin.

10. The solution of claim 9, wherein the fatty acid ester is selected from the caproic acid ester, caprylic acid ester, capric acid ester, lauric acid ester, oleic acid ester, linoleic acid ester, linolenic acid ester, ricinoleic acid ester, erucic acid ester, isononanoic acid ester, coconut oil fatty acid ester or beef tallow fatty acid ester.

* * * * *

UNITED STATES PATENT AND TRADEMARK OFFICE
CERTIFICATE OF CORRECTION

PATENT NO. : 5,081,333
DATED : January 14, 1992
INVENTOR(S) : Yatomi et al

It is certified that error appears in the above-identified patent and that said Letters Patent is hereby corrected as shown below:

IN THE TITLE PAGE:

[73] Should read as follows:
Assignee: Mitsubishi Denki Kabushiki Kaisha and
Yushiro Chemical Industry Co., LTD, Tokyo, Japan Signed and Sealed this Tenth Day of May, 1994

Attest:

BRUCE LEHMAN

Attesting Officer        Commissioner of Patents and Trademarks